Figure 1:
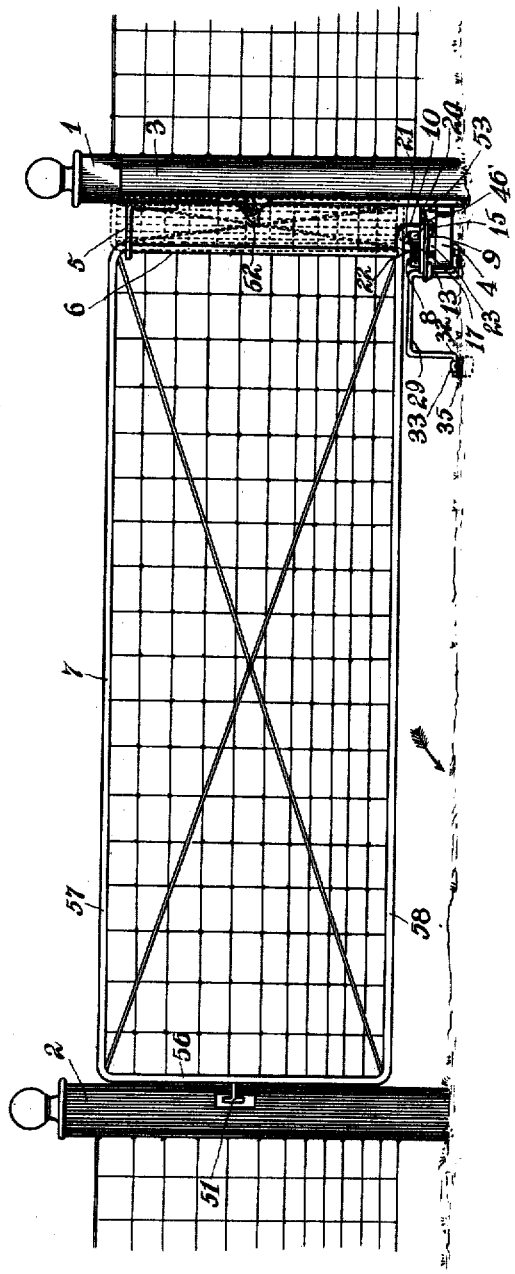

E. BORDER.
GATE.
APPLICATION FILED JULY 22, 1910.

998,459.

Patented July 18, 1911.
3 SHEETS—SHEET 1.

Witnesses
Thos. F. Knox
Wm. Roorth

Inventor
Edward Border
By Victor J. Evans
Attorney

E. BORDER.
GATE.
APPLICATION FILED JULY 22, 1910.
998,459.
Patented July 18, 1911.
3 SHEETS—SHEET 2.
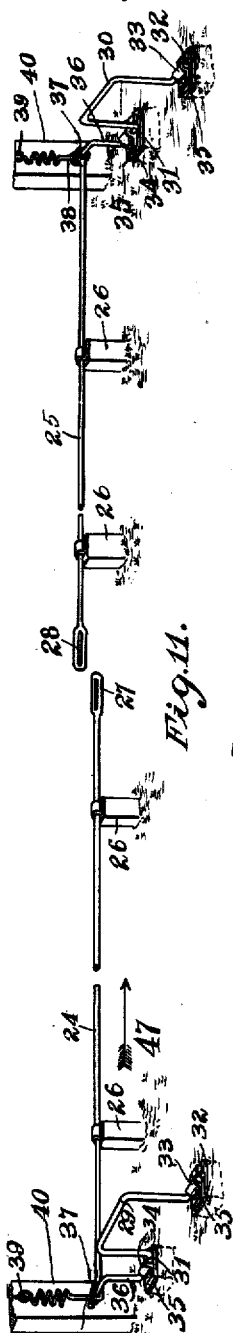
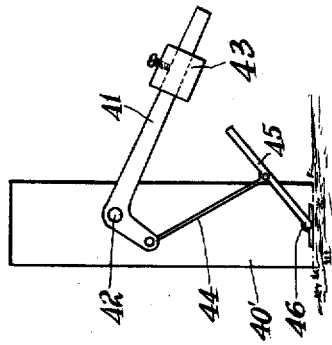
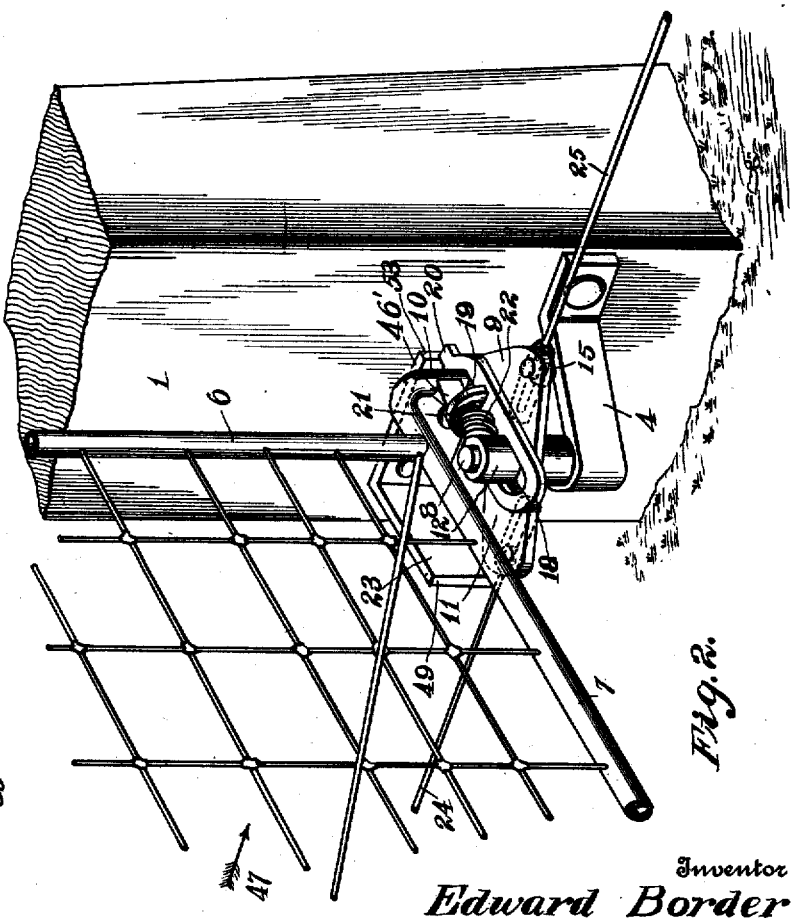
Inventor
Edward Border
By Victor J. Evans
Attorney
Witnesses
Thos. F. Knox
Wm. Booth E. BORDER.
GATE.
APPLICATION FILED JULY 22, 1910.
998,459.
Patented July 18, 1911.
3 SHEETS—SHEET 3.
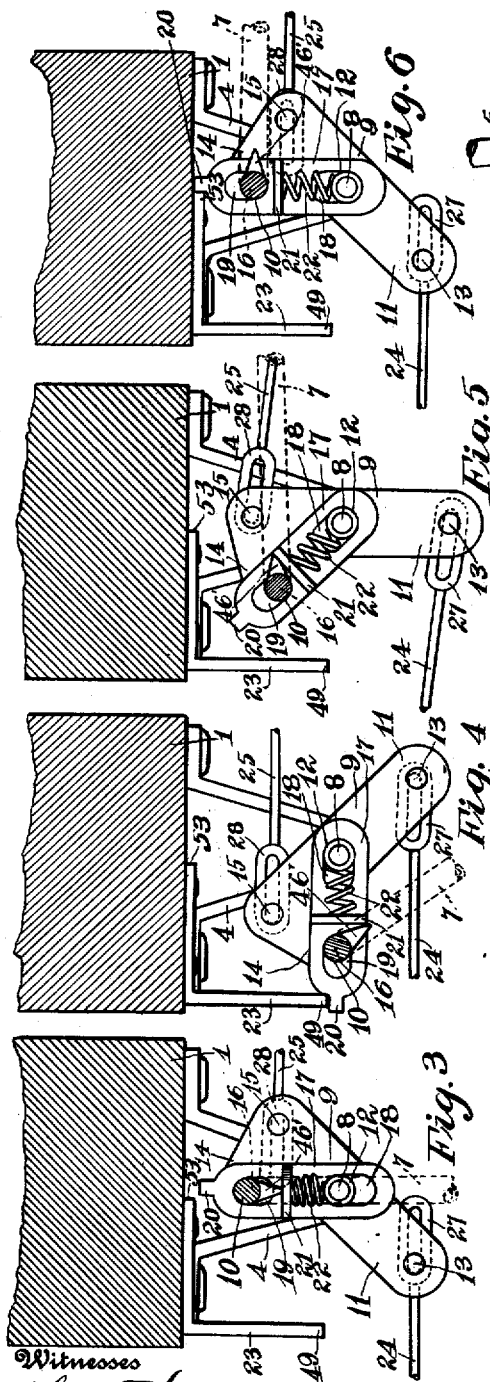
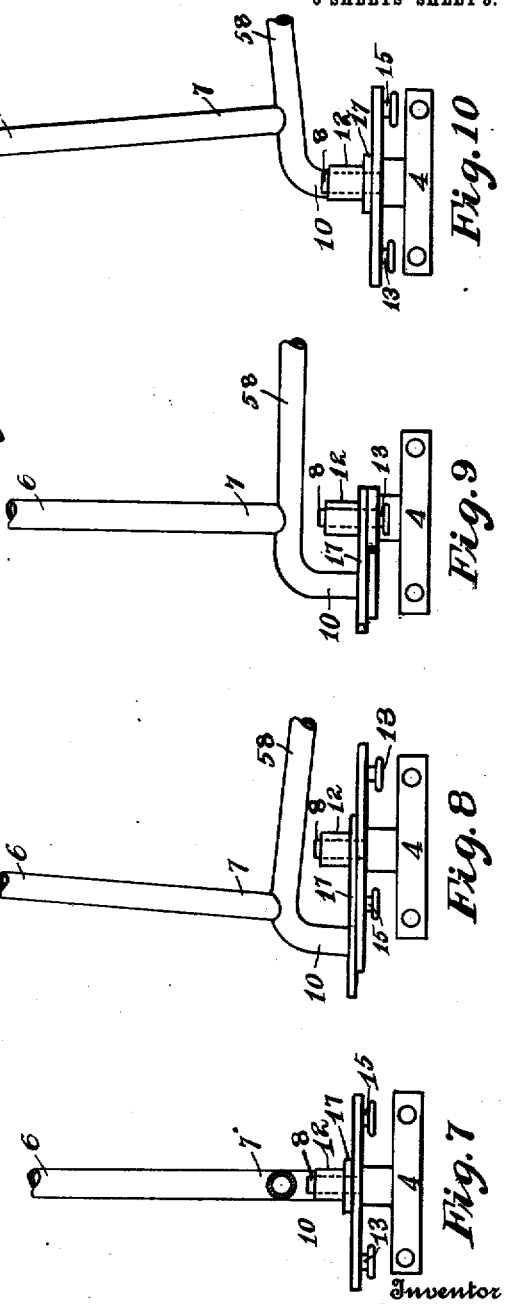
Inventor
Edward Border
By Victor J. Evans
Attorney
Witnesses
Thos. F. Knox,

UNITED STATES PATENT OFFICE.

EDWARD BORDER, OF YORKSHIRE, OHIO.

GATE.

998,459.  Specification of Letters Patent.  Patented July 18, 1911.

Application filed July 22, 1910. Serial No. 573,277.

*To all whom it may concern:*

Be it known that I, EDWARD BORDER, a citizen of the United States, residing at Yorkshire, in the county of Darke and State of Ohio, have invented new and useful Improvements in Gates, of which the following is a specification.

This invention relates to improvements in gate operating mechanism, and the primary object of the invention is to provide a device of this class having bail-shaped tripping levers positioned in the roadway adjacent each side of the gate whereby the wheel of a vehicle contacting with one of the said trip levers and going in one direction will cause the gate to open and the said vehicle contacting with the trip lever on the opposite side of the gate will automatically close the said gate.

Another object of the invention is to provide a device of this class which may be operated by hand without interfering with either of the trip levers.

A still further object of the invention is to provide a movable plate or throwing device upon which the gate is mounted, with a latch member adapted to sustain the plate when moved to tilt the arm of the gate to a desired angle so as to allow the gate through its own weight to automatically open or close.

With the above and other objects in view, which will appear as the description progresses, the invention resides in the novel construction and combination of parts hereinafter fully described and claimed.

In the accompanying drawings, Figure 1 is a side elevation of a gate constructed in accordance with the present invention, the dotted lines illustrating the same in its open position. Fig. 2 is a perspective view of the throwing mechanism. Figs. 3, 4, 5 and 6 are detail sectional views illustrating the different positions of the mechanism when the gate is being opened and closed. Figs. 7, 8, 9 and 10 illustrate in diagram the positions assumed by the gate when the plates are brought to the positions illustrated in Figs. 3, 4, 5 and 6 respectively. Fig. 11 is a perspective view of the operating rods and their connections, the gate being removed. Fig. 12 is a side elevation of a slightly modified form of the operating rod returning mechanism.

In the accompanying drawings the numeral 1 designates the post to which the gate is hinged, 2 the post for the gate when the same is in its closed position, and 3 the stop post for the gate when the same is in its open position.

Secured upon the post 1 and adjacent the top and bottom edges thereof are a pair of supporting brackets 4 and 5. The bracket 5 is provided with an enlarged opening through which the vertical end member 6 of the gate 7 passes. The lower bracket 4 is provided with an upstanding pintle 8, and pivotally connected with the said pintle is a plate 9 upon which the lower offset end 10 of the vertical end member 6 of the gate is snugly mounted. The plate 9 comprises a substantially L-shaped member, and has its enlarged arm 11 provided with an upstanding collar 12 which is adapted to be inserted upon the pintle 8 of the bracket 4. The said enlarged arm 11 is provided adjacent its free end with a depending pin 13 and at its juncture with the short arm 14 with a similar depending pin 15. The short arm 14 has its extremity provided with an opening 16, and the purpose of this structure will be presently set forth.

Slidably mounted upon the collar 12 of the plate 9 is a latch member 17. This latch member 17 is preferably provided with a pair of elongated slots 18 and 19, the slot 18 engaging the collar 12 and the slot 19 being adapted to aline with the opening 16 of the smaller arm 14 of the plate 9. The latch member has its inner end provided with a projecting finger 20, and the latch member is further, preferably centrally provided with a transverse vertical offset 21. Positioned upon the collar 12 is a double arm spring 22, the same having its free arm contacting the offset 21, so as to normally force the latch 17 and its finger 20 into engagement with one of the ends of a substantially L-shaped plate 23. The offset portion 10 of the gate 7 is adapted to pass through the elongated opening 19 of the latch 17 and to be positioned within the opening 16 of the plate 9. The L-shaped member 23 is secured to the post 1 upon the inner face thereof adjacent one of its edges, as clearly illustrated in Figs. 1, 2, 3, 4, 5 and 6 of the drawings.

The numerals 24 and 25 designate the operating rods of the device. These rods 24 and 25 are each slidably mounted in suitable bearings 26 positioned adjacent each side of the post 1 and the rods 24 and 25 have their inner extremities provided with elongated openings 27 and 28. The inner end provided by the opening of the rod 24 is adapted to normally contact with the pin 13 of the plate 9, while the inner end provided by the opening 28 of the arm 25 is adapted to normally contact with the pin 15 of the plate 9.

The numerals 29 and 30 designate bail-shaped trip levers positioned a suitable distance away from the gate 7 and the posts 1 and 3. These trip levers have their vertical arms offset longitudinally as at 31 and 32, and the said offsets are mounted in suitable bearings 33 and 34 provided upon plates or the like, 35 which have their body portions embedded within the roadway. The offsets 32 are provided with L-shaped members 36, and the horizontal portion of the said L-shaped member is adapted to engage within eyes 37 provided upon the ends of the rods 24 and 25. The extremities of the said L-shaped members 36 are also loosely connected with one of the end convolutions of a helical spring 38, the opposite end of the said spring being secured in a suitable eye 39 provided upon the posts 40.

In Fig. 12 I have illustrated a slightly modified form of the device through which the spring 38 may be dispensed with if desired. The post 40', in this instance, is provided with a bell crank 41, the same being pivoted as at 42 to the said post. The longer arm of the said member 41 is provided with an adjustable weight 43, while the shorter arm is provided with a loosely connected link 44. The end of this link 44 is pivotally connected with an arm 45 which is mounted for movement in a suitable bearing 46 provided adjacent the end of the post 40'. The L-shaped members 36 of the trip levers 29 and 30 are adapted to contact with the arm 45, or the said member 36 may be secured thereto in any desired manner, so as to raise the weight under the pressure of a vehicle wheel. It will be obvious that after the weight of the vehicle passes the trip levers, the weighted arm 43 will return the members to their initial position and cause the trip levers 29 and 30 to assume a vertical position. It is obvious that the spring 38 also causes the trip levers to be returned to a normal vertical position after the weight of a vehicle or the like has been removed from the said levers.

The lower portion of the offset extension 10 of the gate 7 is provided with a lip 46', the same being adapted to contact with the offset 21 of the latch 17 when the gate assumes the various positions now to be described. The operation of the gate is as follows:—We will suppose that a vehicle is traveling in the direction of the arrow 47, Fig. 11. The front wheel of the vehicle will contact with the bail-shaped trip lever 29, causing its L-shaped offset to throw the rod 24, against the pressure of the spring 38, toward the gate 7. By this movement, the plate 9 will revolve upon its pivot 8 causing the vertical members of the gate to assume an inclination, as illustrated in the diagram in Fig. 8, the latch, acting under the pressure of the spring 22 will be forced forward causing its finger 20 to contact with the edge of the wall 49 of the L-shaped member 23. When the gate has assumed this position it will become detached from the latch member 51 provided upon the post 2 and will, of its own weight swing toward the post 3. In its swinging movement the lip 46 will contact with the offset 21 of the latch, causing the same to slide away from the arm 49 of the L-shaped member 23 and allowing the parts to assume the position illustrated in Figs. 5 and 9. It will be noted that the slotted portion 28 of the rod 25 has its inner extremity contacting with the pin 15, so the movement of the plate 9 will not interfere with the said rod. When the gate is in the position just described, and contacting with the post 3, and engaging the latch 52 thereof, the rod 24, through the medium of the L-shaped portion 36 of the trip lever 29 will be returned to its initial position, the spring 38, having caused the said trip lever 29 to assume its initial upright position.

It will be noted by reference to Figs. 3 and 5 that the sliding latch 17 has its finger disengaged from either of the ends of the L-shaped plate 23. When the vehicle passes through the opening between the posts 1 and 2 and contacts with the trip lever 30, the said trip lever will be thrown, causing its L-shaped arm engaging the eye 37 of the rod 25 to move the rod in the direction of the arrow 47. It will be further noted that the swinging of the plate 9 causes the pin 15 to lie directly against the outer wall of the bifurcated portion 28, and as the said rod 25 is moved it will rotate the plate 9 in an opposite direction to that just described, and will cause the finger 20 of the latch 17 to contact the edge 53 of the L-shaped plate 23. By this arrangement, it will be noted that the member 6 of the gate 7 will be caused to assume the position illustrated in Fig. 10 of the diagrammatic view so as to have its horizontal arms or members inclined outwardly to release the end post 56 of the said gate from the latch 52 of the post 3, and allow the gate to swing by its own weight to a closed position against the post 2 and into engagement with the latch 51 thereof. When the gate is in this position it will have its connecting arms 57 and 58 returned to a horizontal position, and the lip 46' of the member 10 contacting the offset 21 of the sliding latch 17 to withdraw its finger 20 from the end 55 of the L-shaped element 23.

From the foregoing description, taken in connection with the accompanying drawing, it will be noted that the sliding latch 17 effectively retains the gate 7 at a sufficient angle for the same to swing either open or closed and that the weight of the gate readily slides the latch so that its finger 20 will be disengaged from either of the ends 49 or 53 of the member 23. It is to be further understood that the lengths of each of the bifurcations 27 and 28 of the rods 24 and 25 are sufficient to rotate the plate 9 so that the latch member may be brought into proper position for engagement with the opposite ends of the L-shaped plate 23 and that the said rods have completed their throw before the gate assumes a position to automatically swing either open or closed.

From the above description, taken in connection with the accompanying drawings, it will be noted that I have provided an extremely simple and effective device for the purpose intended, and while I have illustrated and described the preferred embodiment of the improvement, as it now appears to me, minor details of construction within the scope of the following claims may be resorted to if desired.

Having thus fully described the invention, what I claim as new is:—

1. A gate, posts for the gate, catches upon one of the posts normally engaged by one end of the gate, brackets upon the opposite post, the upper bracket being provided with an opening adapted to loosely engage with this side of the gate, the lower bracket being provided with an oscillatory plate, the lower portion of the gate being connected with the said plate, means for oscillating the plate, the post being provided with an L-shaped member, a latch slidably mounted upon the oscillatory plate, said latch being provided with elongated openings, the said latch having its body formed with an offset and one of its extremities provided with an extending finger, the said finger adapted to normally contact one of the edges of the L-shaped member, the lower portion of the gate adapted to pass through one of the openings of the said latch, means for forcing the latch toward the gate, and the said gate being provided with a lip adapted to contact the offset of the latch when the plate is oscillated.

2. A gate, posts for the gate, one of said posts being provided with a pair of brackets, one end of the gate loosely mounted within the upper bracket, a pintle upon the lower bracket, a plate provided with a collar engaging the pintle, the said plate being provided with an opening, the lower end of the gate having an offset engaging the opening, the plate being provided with oppositely disposed pins, longitudinally movable rods, each having one of its extremities provided with elongated openings engaging the pins, said rods having their opposite ends provided with eyes, a bell crank tripping lever engaging each of the eyes, and elements connected with the trip levers for normally sustaining the same in a vertical or upright position.

3. A substantially rectangular gate, posts for the gate, a bracket upon one of the posts having an opening adapted for the reception of one of the vertical end members of the gate, the lower extremity of this member being offset, a second bracket upon this post, a pintle upon this bracket, a substantially L-shaped plate pivotally mounted upon the pintle, said plate having one of its arms provided with depending pins, the opposite arm of the plate being provided with an opening adapted for the reception of the offset end of the gate, the remaining posts for the gate being provided with catches adapted to engage the opposite end member of the gate, longitudinally extending rods each with one end formed with elongated openings engaging the pins of the plate, the outer wall provided by one of the elongated openings upon one of the rods adapted to lie adjacent to one of the pins, the inner wall provided by the elongated opening upon the opposite end of the second rod adapted to lie adjacent the second pin, the free ends of each of the rods having eyes, bail shaped trip levers connecting with the eyes of the rods, means for automatically sustaining the trip levers in a vertical position, and said means also adapted to return the levers to the said vertical position after one or each has been swung.

In testimony whereof I affix my signature in presence of two witnesses.

EDWARD BORDER.

Witnesses:
A. J. SCHNIETERMAN,
H. J. BURNS.

Copies of this patent may be obtained for five cents each, by addressing the "Commissioner of Patents, Washington, D. C."